(No Model.)
B. S. LILLY.
HARNESS ATTACHMENT.
No. 527,433. Patented Oct. 16, 1894.
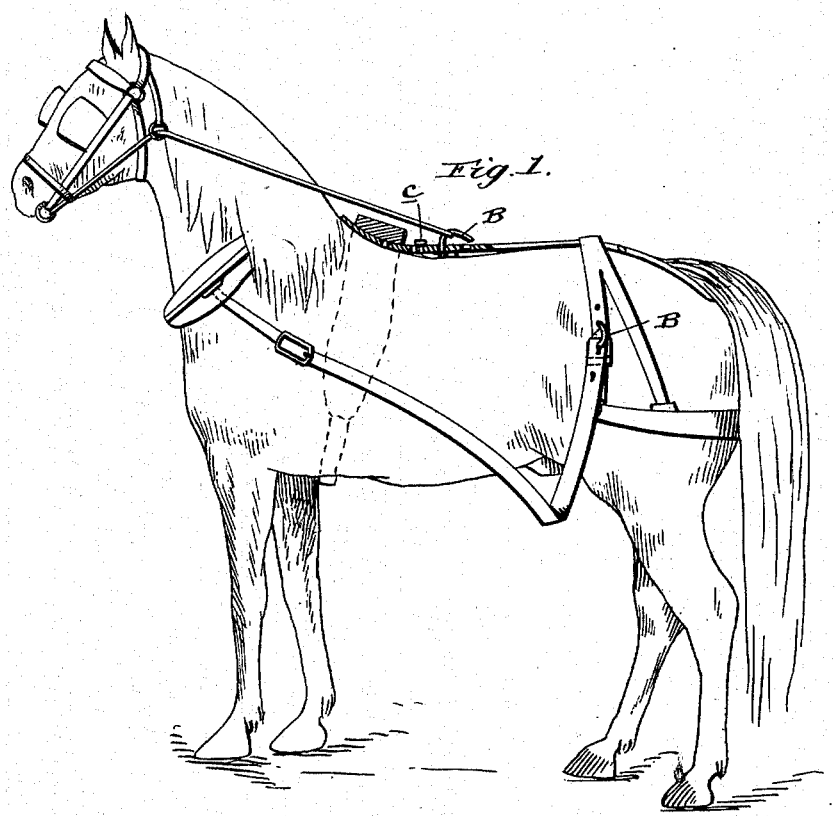
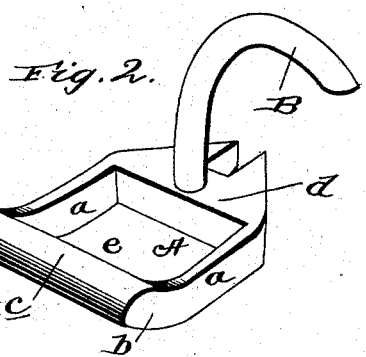
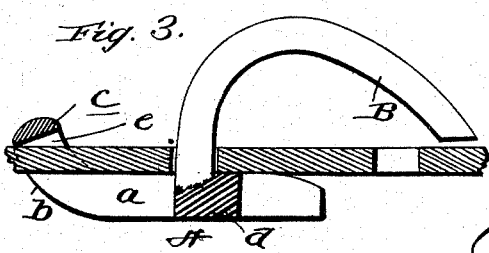
Witnesses:
Inventor
B. S. Lilly
By Jas. J. Shuhy
Attorney

UNITED STATES PATENT OFFICE.

BENJAMIN S. LILLY, OF BROKEN BOW, NEBRASKA.

HARNESS ATTACHMENT.

SPECIFICATION forming part of Letters Patent No. 527,433, dated October 16, 1894.

Application filed January 31, 1894. Serial No. 498,607. (No model.)

*To all whom it may concern:*

Be it known that I, BENJAMIN S. LILLY, a citizen of the United States, residing at Broken Bow, in the county of Custer and State of Nebraska, have invented certain new and useful Improvements in Harness Attachments; and I do declare the following to be a full, clear, and exact description of the invention, such as will enable others skilled in the art to which it appertains to make and use the same.

This invention has relation to a harness attachment designed to be placed upon various parts of a harness for receiving and holding a check rein, a trace end, or the like, and the novelty will be fully understood from the following description and claim when taken in connection with the annexed drawings, in which—

Figure 1, is a view of a horse with harness thereon, and illustrating two applications of my improved device. Fig. 2, is a perspective view of the device removed from the harness, and Fig. 3, is a longitudinal sectional view of the device attached to a strap.

Referring by letter to said drawings: A, indicates the main frame of the device, which has parallel side bars $a$, curved upwardly at one end as shown at $b$, and connected by a transverse cross bar $c$.

$d$, indicates a cross bar or plate at the opposite end of the frame which is on a lower plane than that of the cross bar $c$, at the opposite end, so as to allow a strap to be passed beneath said cross bar $c$, through the loop $e$, and over the top of the plate or cross bar $d$, without any interruption.

B, indicates a hook. This hook rises centrally from the upper side of the cross bar $d$, and curved upwardly, rearwardly or outwardly, and thence downwardly to a plane on approximately the upper side of the cross bar $d$, and said cross bar is slotted at a point below the hook so as to facilitate casting of the article. These devices are preferably formed of metal, although they may be composed of any suitable material, and for the sake of cheapness in manufacture, they may be cast entire.

When using the device to receive a check rein, it is simply necessary to place it on the back strap, with the strap passing through the loop $e$, and a hole in the strap taking over the hook B. The hook projecting beyond the end of the frame, it will be seen that in practice it will have a bearing upon the upper side of the strap to which it is attached, and thereby prevent any disconnection of the check rein or other article, hooked over it; while to hook or unhook the line, it is simply necessary to press it down upon the back strap, pushing the latter away from the hook and then drawing it under the hook.

In using the device as a trace carrier, it is placed upon one of the hip straps in a similar manner with the hook directed upwardly.

A device of this character may be very cheaply manufactured. It may be quickly applied to and removed from the harness; and it avoids the expensive objection of building the check hooks in the saddle, which when they become broken or injured, necessitates pulling the saddle apart to replace it by another.

It will be observed that the hook not only serves to receive the check rein or the cock eye of a trace, but it also serves as a stud for attaching the article to any part of a harness.

Having described my invention, what I claim is—

The herein described harness attachment comprising the cross bar or plate $d$, the side bars $a$, connected at one end to the bar or plate $d$, and having their opposite ends curved upwardly, the cross bar $c$, connecting the curved ends of the side bars and adapted to rest on the opposite side of a strap with respect to the bar $d$, and the hook B, rising from the cross bar or plate $b$, and curving away from the frame A; said hook B, being adapted to serve the two fold function of attaching the device to a strap and receiving a check rein or the like, substantially as and for the purpose set forth.

In testimony whereof I affix my signature in presence of two witnesses.

BENJAMIN S. LILLY.

Witnesses:
ALPHONSO MOORE,
FRANK E. VAN ANTWERP.